United States Patent

Van Gorkom et al.

[11] Patent Number: 5,386,175
[45] Date of Patent: Jan. 31, 1995

[54] THIN-TYPE PICTURE DISPLAY DEVICE

[75] Inventors: Gerardus G. P. Van Gorkom; Petrus H. F. Trompenaars; Siebe T. De Zwart; Nicolaas Lambert, all of Eindhoven, Netherlands

[73] Assignee: U.S. Philips Corporation, New York, N.Y.

[21] Appl. No.: 183,568

[22] Filed: Jan. 19, 1994

Related U.S. Application Data

[63] Continuation of Ser. No. 939,387, Aug. 31, 1992, abandoned, which is a continuation of Ser. No. 715,073, Jun. 13, 1991, abandoned, and a continuation-in-part of Ser. No. 830,951, Feb. 6, 1992, Pat. No. 5,313,136, which is a continuation of Ser. No. 528,677, May 24, 1990, abandoned.

[30] Foreign Application Priority Data

Jul. 5, 1990 [NL] Netherlands .......................... 9001529

[51] Int. Cl.⁶ .......................... H01J 29/70; H01J 29/72
[52] U.S. Cl. .......................... 313/422; 313/495; 313/482; 313/258; 313/103 CM; 313/105 CM
[58] Field of Search ............... 313/422, 495, 482, 258, 313/103 CM, 105 CM; 315/169.4; 345/37, 41, 47, 60, 75

[56] References Cited

U.S. PATENT DOCUMENTS

| | | | |
|---|---|---|---|
| 4,028,582 | 6/1977 | Anderson et al. | 313/422 |
| 4,069,439 | 1/1978 | Anderson | 313/422 |
| 4,101,802 | 7/1978 | Andrevski | 313/422 |
| 4,298,819 | 11/1981 | Credelle et al. | 313/422 |
| 4,435,672 | 3/1984 | Heynish | 313/422 |
| 4,450,940 | 8/1994 | Woodhead et al. | 313/422 |
| 4,563,613 | 1/1986 | Genovese et al. | 313/422 |
| 4,564,790 | 1/1986 | Veita | 313/422 X |
| 4,622,497 | 11/1986 | Miyama et al. | 313/422 |
| 4,719,388 | 1/1988 | Oess | 313/422 |
| 4,752,721 | 6/1988 | Nishida et al. | 313/422 |
| 4,757,230 | 7/1988 | Washington et al. | 313/422 |
| 4,873,472 | 10/1989 | Freeman | 313/422 |
| 4,879,496 | 11/1989 | Knapp et al. | 313/422 X |
| 4,927,218 | 5/1990 | Zegers | 313/422 X |
| 4,965,487 | 10/1990 | Freeman | 313/422 |

FOREIGN PATENT DOCUMENTS

| | | |
|---|---|---|
| 0079108 | 5/1983 | European Pat. Off. |
| 0213839 | 3/1987 | European Pat. Off. |
| 3112200 | 10/1982 | Germany |

Primary Examiner—Donald J. Yusko
Assistant Examiner—Ashok Patel
Attorney, Agent, or Firm—Robert J. Kraus

[57] ABSTRACT

A flat, thin picture display device has a transparent face plate and a rear plate and a large number of electron sources and local electron transport ducts cooperating therewith. A selection plate arranged between the face plate and the rear plate has an arrangement of apertures which defines locations for withdrawing electrons from the electron transport ducts and, aligned therewith, a row of apertures defining locations for the electron sources.

41 Claims, 4 Drawing Sheets

THIN-TYPE PICTURE DISPLAY DEVICE

CROSS REFERENCE TO RELATED APPLICATION

This application is a continuation of U.S. patent application Ser. No. 07/939,387, filed on Aug. 31, 1992, now abandoned, which is a continuation of U.S. patent application Ser. No. 07/715,073 filed on Jun. 13, 1991, now abandoned, and a continuation-in-part of U.S. patent application Ser. No. 07/830,951, filed on Feb. 6, 1992, now U.S. Pat. No. 5,313,136, which is a continuation of U.S. patent application Ser. No. 07/528,677 filed on May 24, 1990, now abandoned.

BACKGROUND OF THE INVENTION

The invention relates to a picture display device having a vacuum envelope for displaying pictures composed of pixels on a luminescent screen, and particularly relates to a thin picture display device (i.e. a picture display device having a small "front-to-back dimension") which is clearly distinguished from state-of-the-art display devices.

Typical state-of-the-art approximations to thin-type picture display devices are devices having a transparent face plate and a rear plate which are interconnected by means of partitions and in which the inner side of the face plate is provided with a phosphor pattern, one side of which is provided with an electrically conductive coating (the combination also being referred to as a luminescent screen). If (video information-controlled) electrons impinge upon the luminescent screen, a visual image is formed which is visible via the front side of the face plate. The face plate may be flat or, if desired, curved (for example, spherical or cylindrical).

A specific category of picture display devices of the thin type uses single or multiple electron beams which initially extend substantially parallel to the plane of the display screen and are ultimately bent towards the display screen so as to address the desired areas of the luminescent screen either directly or by means of, for example, a selection grid structure. (The expression electron beam is understood to mean that the paths of the electrons in the beam are substantially parallel, or extend only at a small angle to one another and that there is a main direction in which the electrons move). The above-mentioned devices operating with controlled electron beams require, inter alia, complicated electron-optical constructions.

Moreover, picture display devices of the single beam type generally require a complicated (channel plate) electron multiplier of the matrix type, certainly if they have slightly larger screen formats.

SUMMARY OF THE INVENTION

In view of the foregoing it is an object of the invention to provide a thin-type picture display device which substantially does not have the drawbacks of the above-mentioned devices.

According to the invention, a picture display device having a vacuum envelope for displaying pictures composed of pixels on a luminescent screen comprises a plurality of juxtaposed sources for producing electrons, local transport ducts cooperating with the sources and having walls of substantially electrically insulating material having a secondary emission coefficient suitable for transporting produced electrons in the form of electron currents, and first selectively energizable electrode means for withdrawing each electron current from its transport duct at predetermined extraction locations and directing them towards the luminescent screen for forming a picture composed of pixels. A selection plate system is arranged at a distance between the front and rear walls by means of front and rear spacers and has a main surface with an arrangement of apertures defining the extraction locations and, aligned therewith, a row of apertures defining electron source locations.

The inventive approach of providing a thin-type picture display device is based on the discovery that electron transport is possible when electrons impinge on an inner wall of an elongate evacuated cavity (so-called compartment) defined by walls of electrically insulating material (for example, glass or synthetic material) if an electric field of sufficient power is realised in the longitudinal direction of the compartment (for example, by applying an electric potential difference across the ends of the compartment). The impinging electrons then generate secondary electrons by wall interaction which are attracted to a further wall section and in their turn generate secondary electrons by wall interaction. As will be further described, the circumstances (field strength E, electrical resistance of the walls, secondary emission coefficient $\delta$ of the walls) may be chosen to be such that a constant vacuum current will flow in the compartment.

Starting from the above-mentioned principle, a flat picture display device can be realised by providing each one of a plurality of juxtaposed compartments constituting transport ducts with a column of apertures constituting extraction locations at one side to be directed towards a display screen. In this case it is practical to arrange the extraction locations of adjacent transport ducts along parallel lines extending transversely to the transport ducts. By associating row-sequentially arranged electrode means to the arrangement of apertures, which electrode means are energizable by means of a first (positive) electric voltage (pulse) so as to withdraw electron currents from the compartments via the apertures of a row, or which are energizable by means of a second (lower) electric voltage if no electrons are to be locally withdrawn from the compartments, an addressing means is provided with which electrons withdrawn from the compartments can be directed towards the screen for producing a picture composed of pixels.

To ensure that the device according to the invention can be manufactured with a minimum of alignment problems, it specifically has a selection plate positioned between the front and rear walls and having an aperture pattern defining both the extraction locations and the locations of the electron sources.

Such a structure can be easily made with a sufficiently great accuracy by means of, for example, lithographic techniques. Electrically conducting strips having apertures aligned with the apertures in the plate and constituting electrode means for selectively withdrawing electrons from the apertures can be easily provided on the structure by means of, for example photolithographic techniques. Since in the construction described above the locations of the electrons impinging upon the luminescent screen (the "spots") are defined by the apertures in the selection plate, the other components which are used, such as the spacers, may be made with less precise accuracy, which has a cost-saving effect. Nevertheless a very high resolution can be achieved because the selection plate itself can be made with very great accuracy.

An important elaboration of the above-described principle is characterized in that the selection plate system has supporting means at its side facing the luminescent screen, which means support the arrangement of electron sources for cooperating with the transport ducts.

To be able to drive the electron sources individually, strip-shaped drive electrodes each having an aperture which is aligned with one of the apertures defining the electron source locations are preferably arranged on a main surface of the selection plate system.

For a simple electric connection an embodiment is characterized in that the electron source arrangement is present proximate to an edge of the main surface and in that a strip-shaped electron source drive electrode provided on the main surface is associated with each aperture defining an electron source location, which electrode extends from the aperture into the direction of the edge, while it is particularly advantageous if the edge extends beyond at least one of the partitions connecting the front and rear walls. Drive circuits (possibly in chip form—"chip on glass") may be arranged between the ends of the drive electrodes and the edge. These circuits may be present within or outside the vacuum envelope.

As already noted hereinbefore, it is practical to arrange the apertures in the selection plate along rows extending transversely to the transport ducts. In this case the front (screen-sided) spacer preferably comprises a system of mutually parallel walls which extend between the apertures at an angle to the rows of apertures.

As will be further described, it may be advantageous, in connection with the available space, for the walls of the system to extend transversely to the rows of apertures.

If the "horizontal" resolution is to be increased without reducing the pitch of the transport ducts, a possibility is provided by an embodiment which is characterized in that each extraction location is defined by at least a first and a second aperture and in that the first selectively energizable electrode means comprises at least a first system of sub-electrodes for line-sequentially driving the first apertures and a second system of sub-electrodes for line-sequentially driving the second apertures.

Colour display is possible in different manners with the device according to the invention. A constructive simple embodiment is characterized in that the number of parallel rows is three times as large for colour display as the number of lines of a picture to be displayed and corresponds to the number of phosphor lines on the luminescent screen. When there are n picture lines, 3n electric connections and drive circuits are required in the most general case.

An alternative embodiment which is simpler in an electrical respect is characterized in that the selection plate system comprises two sub-selection plates which are spaced apart:

one preselection plate facing the rear wall and having apertures defining the extraction locations and the electron source locations; and one fine selection plate facing the front wall and having at least two apertures associated with each extraction location in the preselection plate.

If there are, for example, n/m rows of preselection apertures in the preselection plate and 3m fine selection apertures for each preselection aperture, only n/m+3m connections/drive circuits are sufficient in the case of colour display of n picture lines on the screen. Consequently, if m is chosen to be 3, 201 instead of 1728 connections/drive circuits are required for displaying 576 picture lines.

BRIEF DESCRIPTION OF THE DRAWING

Some embodiments of the invention will be described in greater detail with reference to the drawing figures in which the same reference numerals are used for corresponding components.

DESCRIPTION OF THE PREFERRED EMBODIMENTS

Figure 1:
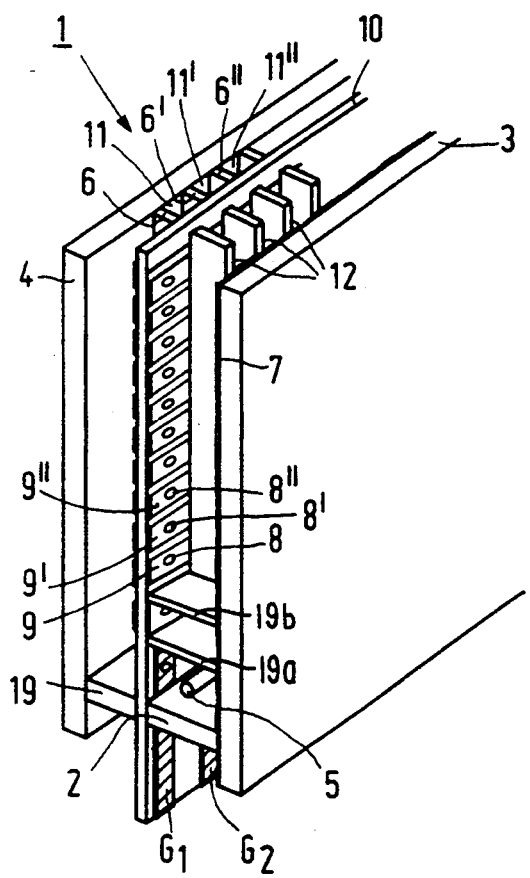
FIG. 1 is a diagrammatic perspective elevational view, partly broken away, of a part of a construction of a picture display device according to the invention whose components are not drawn to scale.
Figure 3:
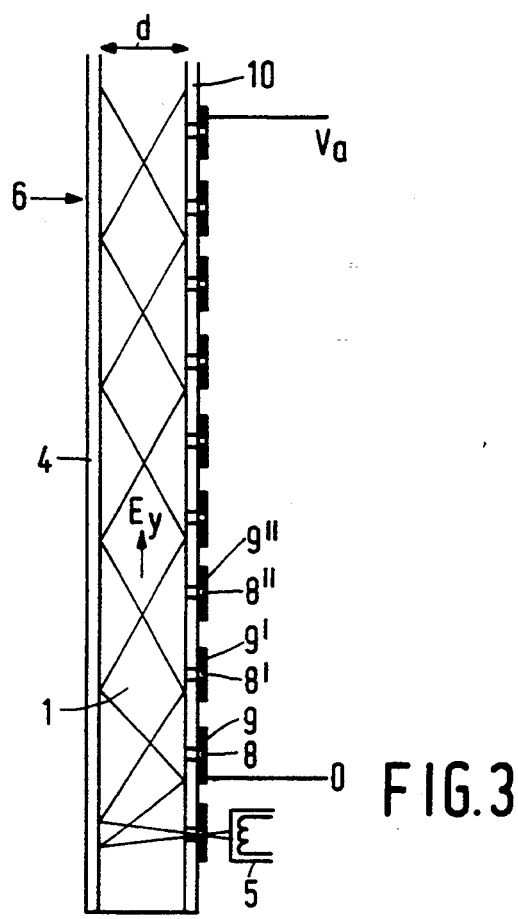
FIG. 3 shows the operation of a specific electron transport duct to be used in the construction of FIG. 1 with reference to a "vertical" cross-section.

FIG. 1 shows a thin-type picture display device 1 according to the invention having a front wall (window) 3 and a rear wall 4 located opposite the front wall. An electron source arrangement, for example, a line cathode 5 and electrodes G1, G2, . . . provides a large number of electron emitters, for example 600, arranged proximate to a wall 2 which connects front wall 3 and rear wall 4. A corresponding number of separate electron emitters may alternatively be used. Each of these emitters is to provide a relatively small current so that many types of cathodes (cold or thermal cathodes) are suitable as emitters. The emission is preferably controlled by means of the video signal. An alternative is to apply the video information to a gating structure arranged subsequent to the electron source arrangement, (for example, a line cathode in this case) instead of to the emitters. The line cathode 5 is arranged opposite to a row of entrance apertures communicating with respective transport ducts 11, 11', 11" extending substantially parallel to the screen, which ducts are defined by compartments 6, 6', 6", . . . etc. in this case one compartment for each electron source. One of these compartments is shown in cross-section in FIG. 3.

Figure 4:
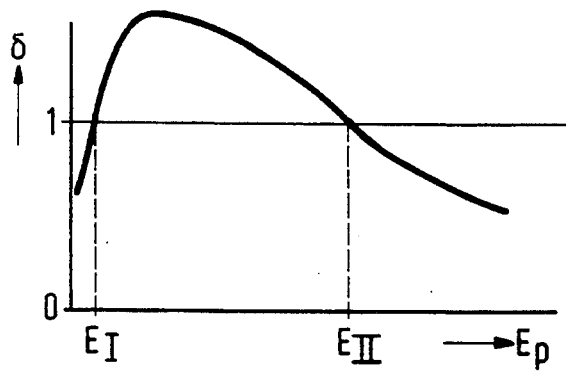
FIG. 4 shows a graph in which the secondary emission coefficient $\delta$ as a function of the primary electron energy $E_p$ is plotted for a wall material which is characteristic of the invention.

At least one wall (preferably the rear wall) of each compartment is made of a material which has a suitable electrical resistance for the purpose of the invention (for example, ceramic material, glass, synthetic material—coated or uncoated) and which has a secondary emission coefficient $\delta > 1$ over a given range of primary electron energies (see FIG. 4). The electrical resistance of the wall material has such a value that a minimal amount of current will flow in the walls in the case of a field strength ($E_y$) in the compartments of the order of one hundred to several hundred Volts per cm, required for the electron transport. Currents as low as 1 microampere have been found to be realisable. By applying a voltage on the order of several dozen to several hundred Volts (value of the voltage is dependent on circumstances) between the cathode 5 and a compartment, electrons are accelerated from the cathode 5 towards the compartment 6 whereafter they generate secondary electrons in the compartment by wall interaction (see FIG. 3).

The invention is based on the recognition that vacuum electron transport within compartments having walls of electrically insulating material is possible if an electric field ($E_y$) of sufficient power is applied in the longitudinal direction of the compartment. Such a field realises a given energy distribution and spatial distribution of electrons injected into the compartment so that the effective secondary emission coefficient $\delta_{eff}$ of the walls of the compartment will be equal to 1 on average in operation. Under these circumstances one electron will leave for each electron which enters (on average), in other words, the electron current is constant throughout the compartment and is approximately equal to the current which enters. If the wall material is high-ohmic enough (which is the case for all appropriate untreated glass types, as well as for KAPTON polyamide material PERTINAX plastic-impregnated-paper materials and ceramic insulating materials), the walls of the compartment cannot produce or take up any net current so that this current, even in a close approximation is equal to the entering current. If the electric field is made larger than the minimum value which is required to obtain $\delta_{eff}=1$, the following will happen. As soon as $\delta_{eff}$ is slightly larger than 1, the wall is charged inhomogeneously positively (due to the very small conductance this charge cannot be depleted). As a result, the electrons will reach the wall earlier on average than in the absence of this positive charge, in other words, the average energy taken up from the electric field in the longitudinal direction will be smaller so that a state with $\delta_{eff}=1$ adjusts itself. This is a favourable aspect because the exact value of the field is not important, provided that it is larger than the previously mentioned minimum value.

Another advantage is that in the state $\delta_{eff} \approx 1$ the electron current in the compartment is constant and can be made to be very satisfactorily equal via measuring and feed-back or via current control for each compartment so that a uniform picture can be realised on the luminescent screen.

Figure 2:
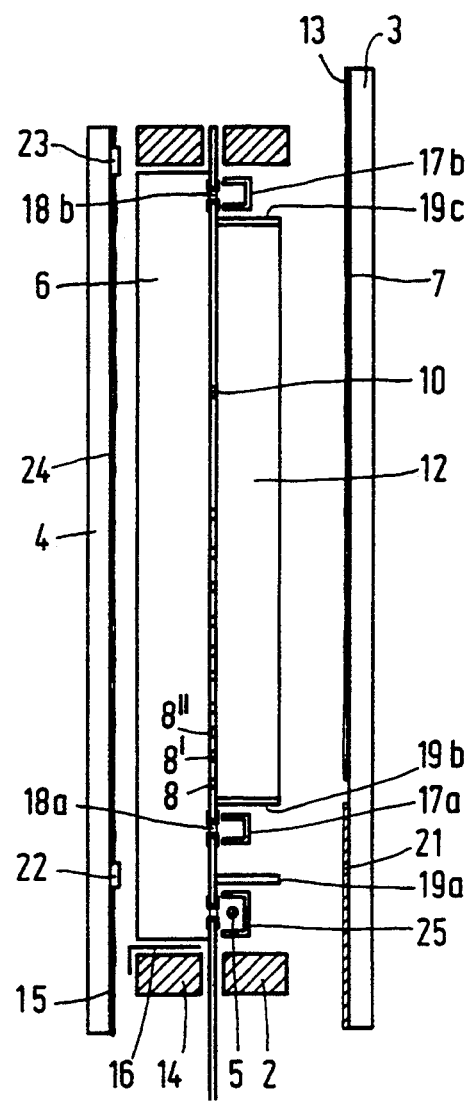
FIG. 2 is a side elevation, broken away, of the construction of FIG. 1 to illustrate the general operation of the invention.

The compartment walls facing the luminescent screen 7, which is arranged on the inner wall of the panel 3, are constituted by a selection plate 10 (see FIG. 2). This plate 10 has extraction apertures 8, 8', 8", . . . etc. which define extraction locations. Provided that specific provisions have been made, a "gating" structure can be used to "withdraw" a flow of electrons from a desired aperture when using cathodes which are not separately driven. However, cathodes which are individually driven by means of electrodes G1, G2, . . . are preferably used in combination with apertured selection electrodes 9, 9', 9", . . . (see also FIG. 5) to be energized by a selection voltage. In the FIG. 1 construction they are formed as strip pairs having apertures which face each other, with the strips of one pair being always arranged opposite each other on the facing main surfaces of the plate 10. The apertures of the strip pairs are aligned with the apertures in the plate 10. The facing strips are preferably interconnected electrically via the apertures 8, 8', 8". To realise this, for example, an apertured plate 10 may be electroless nickel-plated, whereafter a strip pattern is formed from the electroless nickel-plated layer by means of etching. These selection electrodes 9, 9', 9". . . , which may alternatively be provided on only one of the main surfaces of plate 10, are implemented for each picture line, for example in the way shown in FIG. 5 ("horizontal" electrodes 9, 9', 9", . . . with apertures coaxial with the apertures 8, 8', 8", . . . ). The apertures in the electrodes 9, 9', 9", . . . will generally be at least as large as the apertures 8, 8', 8", . . . If they are larger, aligning will be easier. Desired locations on the screen 7 can be addressed by means of (matrix) drive of the individual cathodes and the selection electrodes 9, 9', 9", . . . For example, voltages which increase substantially linearly (as viewed from the cathode side) are applied to the selection electrodes 9, 9', 9". . . When a picture line must be activated, i.e, when electrons must be withdrawn via apertures in an aperture row from the column-wise arranged electron currents flowing behind them, a pulsatory voltage AU is added to the local voltage. In view of the fact that the electrons in the compartments 6, 6', 6", . . . have a relatively low velocity due to the collisions with the walls, AU may be comparatively low (of the order of, for example 100 V to 200 V). In this case a voltage difference $V_a$ is taken across the total compartment height, which is just too small to draw electrons from apertures. This does happen by applying a positive line selection pulse of the correct value.

Selection plate 10 is spaced apart from the front wall 3 and the rear wall 4. In the construction shown in FIGS. 1 and 2 the side walls of the compartments 6, 6', 6", . . . are used as rear spacers to keep the plate 10 spaced apart from the rear wall 4 and "vertical" walls 12 extending transversely to the front wall 3 are provided which are used as front spacers for spacing the plate 10 apart from the front wall 3. In this way a satisfactory vacuum support is realised. In most cases the "horizontal" pitch PH between the apertures 8, 8', 8", . . . will be larger than the "vertical" pitch PV (for example, 1.3 mm and 1 mm, respectively, in the case of monochrome display and 1.3 mm and 0.33 mm, respectively, in the case of colour display) so that it is advantageous in connection with the space to arrange the walls 12 "vertically" (see also FIG. 5). The walls 12 need not be absolutely "vertical", i.e. transverse to the rows of selection electrodes 9, 9', 9", . . . but they may alternatively extend parallel to the row selection electrodes 9, 9', 9", . . .

The ("vertical") walls 12 are preferably made of a material which at a 2nd cross-over point $E_{II}$ of the graph shown in FIG. 4, has a secondary emission coefficient $\delta$ which is so low that there is no unwanted field emission. For example, MACOR ceramic material and window glass have been found suitable.

To prevent penetration of the acceleratiiong field to be applied between the luminescent screen 7 and the plate 10 through the apertures 8, 8', 8", . . . , which could lead to contrast problems, it is preferable to choose the dimensions of the apertures 8, 8', 8", . . . to be sufficiently small. Another possibility is the use of a fine-meshed gauze between the plate 10 and the front wall 3.

Figure 5:
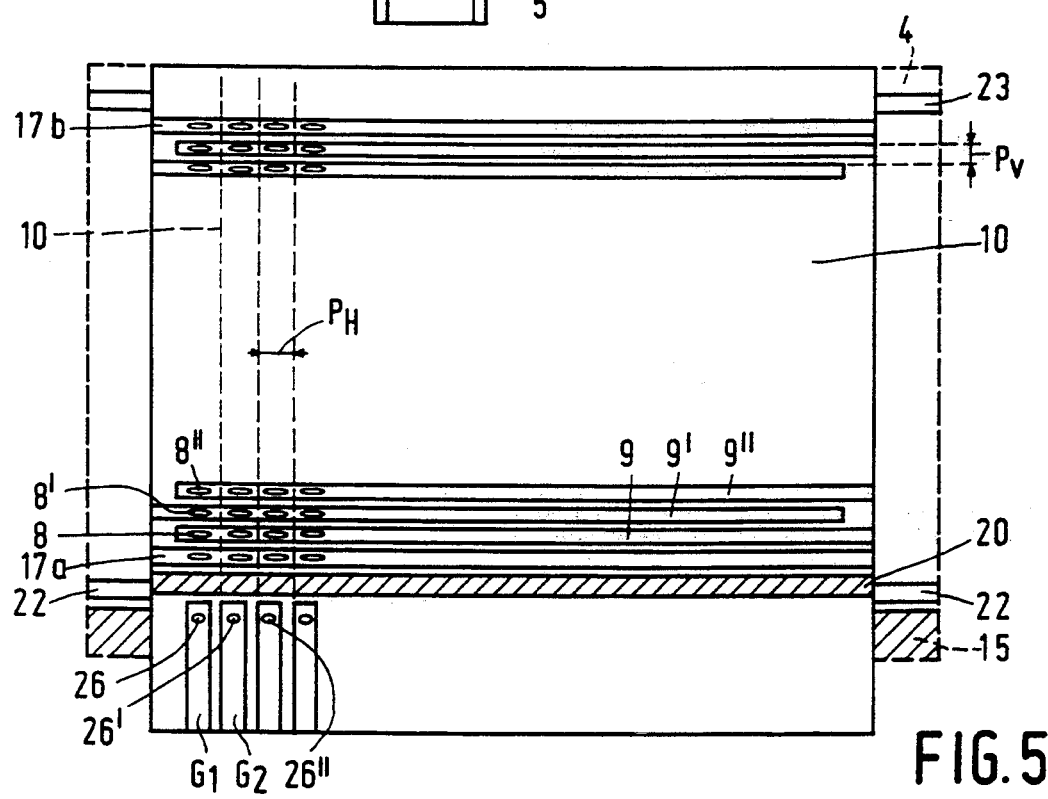
FIG. 5 shows the selection plate 10 of the device shown in FIG. 1, provided with a characteristic (selection) electrode arrangement.

FIGS. 2 and 5 show a plurality of further constructive details which may be present in the display device of FIG. 1:

a. a contact track 13 provided on the front wall 3 for electrically contacting of the luminescent screen;

b. electrodes 15, 16 arranged on the rear wall 4 and on the bottom of the electron transport compartments 6, 6', 6", . . . for helping the electron transport;

c. measuring strips 17a, 17b arranged in the plate 10 opposite apertures 18a, 18b . . . provided with extraction electrodes for checking the uniformity of the electron currents produced in the transport ducts 11, 11', 11", . . . ;

d. cover plates 19a, 19b, 19c;

e. a lead-in electrode 20 (approximately 1 mm high);

f. a shielding face 21;

g. an electron source arrangement 5. This may be, for example, a line cathode having extremities which are suspended on the partitions or which is supported by supporting means (not visible in the Figure) arranged on the plate 10. Instead of a line cathode, separate electron emitters, for example p-n emitters secured on the plate 10 may be used. The reference numeral 25 denotes a shielding means for the electron source arrangement. The electron source arrangement 5 is arranged opposite a row of apertures 26, 26', 26", . . . which are aligned with the arrangement of extraction apertures 8, 8', 8", . . .

Figure 6A:
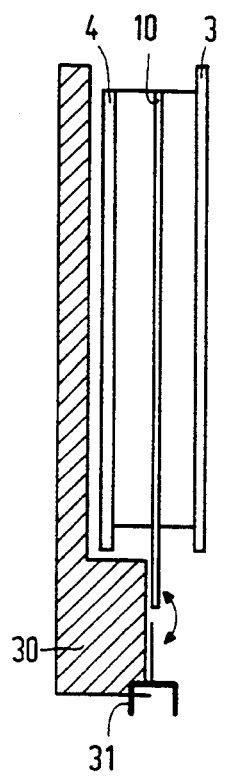
FIG. 6A is an elevational view of a cross-section and FIG. 6B is an elevational view of a longitudinal section through a holder supporting the device of FIG. 1.
Figure 6B:
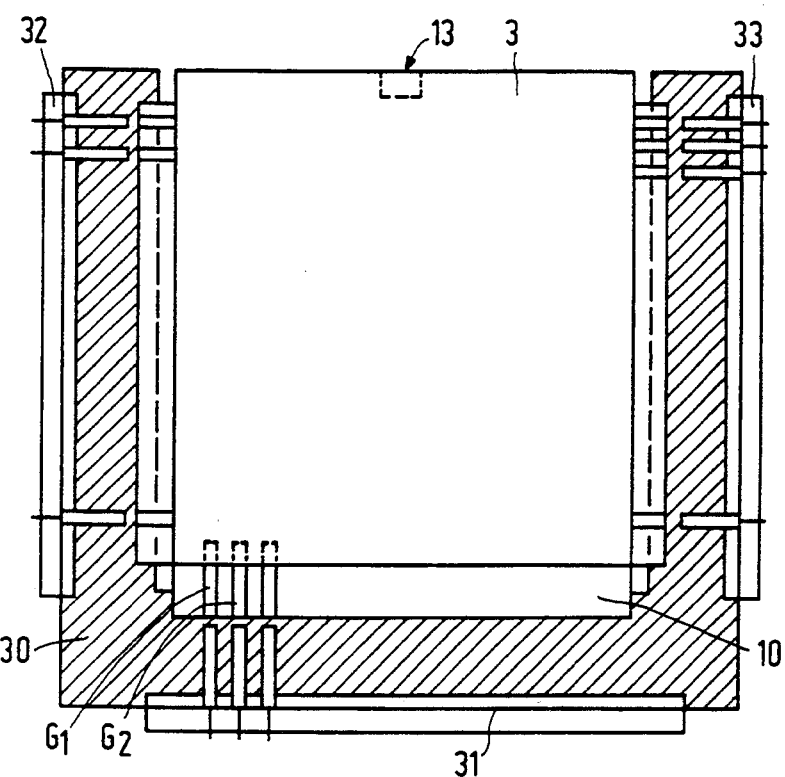

An example of connecting the various electrodes is shown in FIG. 6A which is an elevational view of a cross-section through a holder supporting the device of FIG. 1, and FIG. 6B which is an elevational view of a longitudinal section through the holder 30. External connectors are denoted by the reference numerals 31, 32 and 33. For example, the selection electrodes 9, 9', 9", . . . are implemented in such a way that the selection electrodes having an odd ordinal number extend as far as the left edge of selection plate 10 and the selection electrodes having an even ordinal number extend as far as the right edge of selection plate 10 (see FIG. 5). This simplifies the connection with the connectors 32, 33. The emitter drive electrodes $G_1$, $G_2$ . . . extend as far as the lower edge of the plate 10 and are connected to connector 31.

Figure 7:
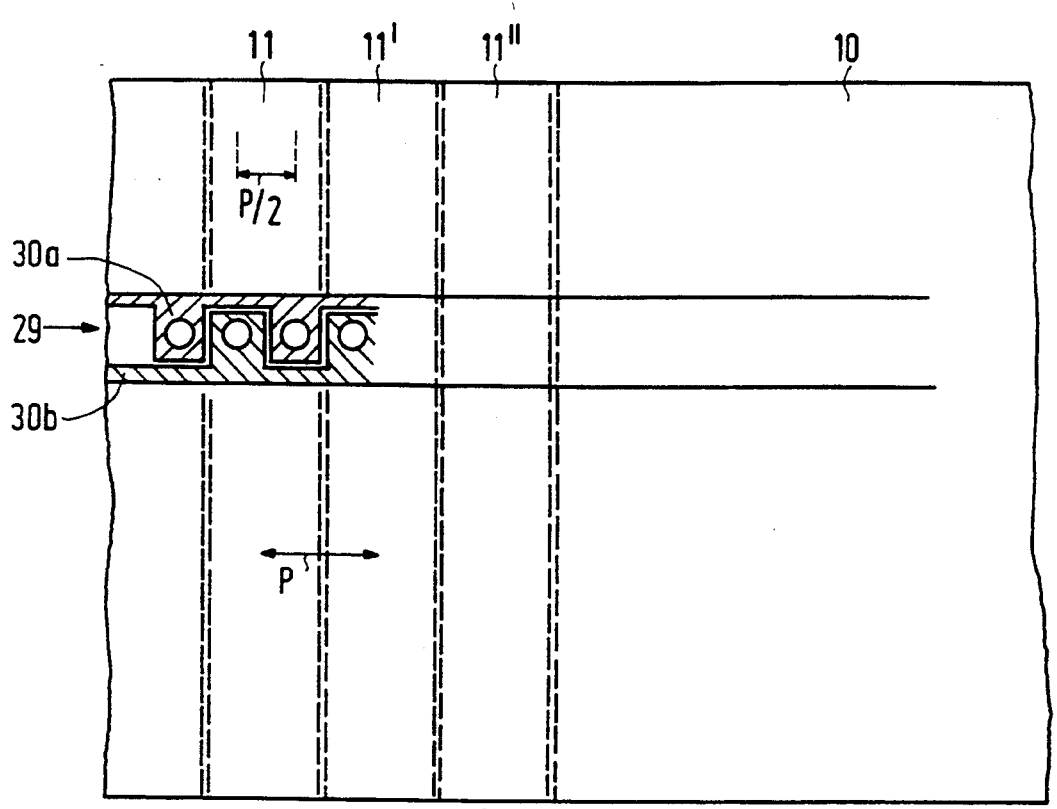
FIG. 7 shows an alternative embodiment of a selection plate 10 for the device shown in FIG. 1.

FIG. 7 shows diagrammatically a part of a selection plate 10 constituting the front wall of transport ducts 11, 11', 11", . . . with a pitch P. In the embodiments shown the horizontal picture resolution is determined by the pitch of the transport ducts. A better resolution can thus be obtained by making this pitch smaller. However, this has the drawback that the voltage drop across the ducts required for transporting the electron currents will increase, which is not always desirable. This problem can be solved by leaving the pitch of the transport ducts unchanged and by giving the spacer structure the required smaller pitch, combined with an adapted pattern of the selection apertures and electrodes, as will be illustrated with reference to FIG. 7.

FIG. 7 shows two extraction apertures for each extraction location so that the pitch of the extraction apertures is half (p/2) that of the transport ducts (p). Each selection electrode 29 is divided into two apertured sub-electrodes 30a and 30b in the manner shown, which simplifies contacting. In this way the horizontal resolution can be doubled with respect to the construction shown in FIG. 1, while the transport ducts 11, 11', 11", . . . can be controlled by the same voltages and in the same manner.

To operate the display device according to the invention in an advantageous mode, a well-defined electric voltage increasing from the cathode side is to be applied particularly across the front and rear walls of the transport ducts, the voltage on the front wall always being slightly lower at the same height. This can be realised, for example, by adjusting the wall potential by means of a high-ohmic resistance layer provided on the relevant wall, such as the resistance layer 24 (FIG. 2) provided on the rear wall, and the electric contacts (22 and 23 in FIG. 2) contacting the resistance layer are used for connection to a voltage source. This resistance layer may have a meandering or zigzag pattern for increasing the resistance. The front wall potential may be adjusted by arranging strip-shaped electrodes on the inner side of the front walls of the transport ducts and giving them, in operation, a (substantially linearly) increasing potential. These electrodes may also be used advantageously for (picture) line selection by providing them with apertures aligned with the apertures in the preselection plate and connecting them to a circuit for providing a (positive) selection voltage.

Figure 8:
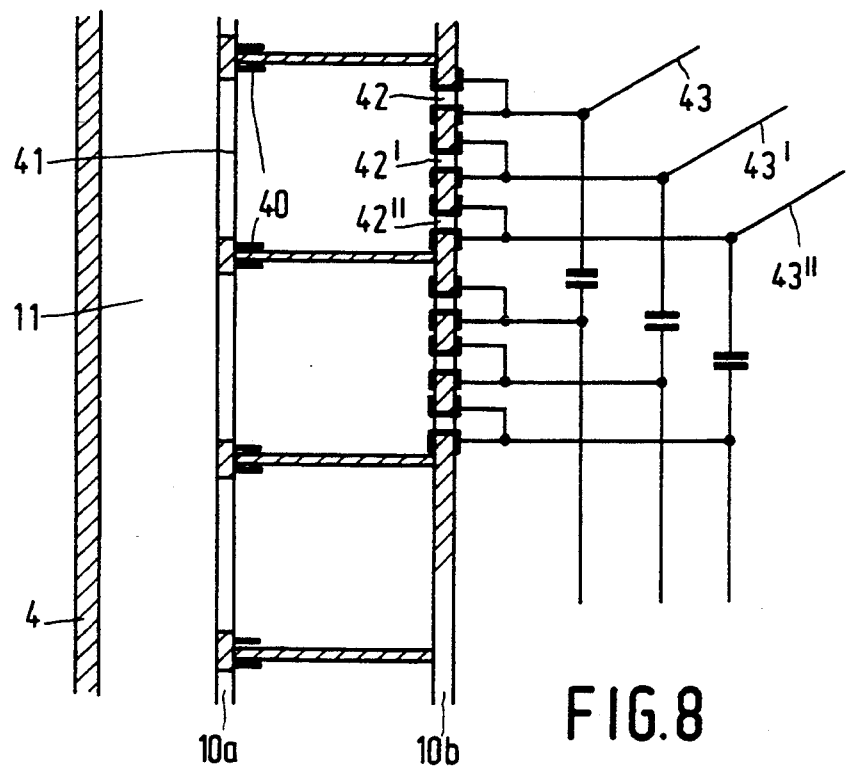
FIG. 8 shows a double selection plate construction by way of a cross-sectional view.

FIG. 8 shows diagrammatically a selection plate system having a preselection plate 10a with preselection apertures 41 and a screen-sided fine selection plate 10b arranged at a distance therefrom.

For the purpose of colour selection three apertures 42, 42', 42" in the fine selection plate lob are associated with each aperture 41, which apertures are drivable by means of fine selection electrodes 43, 43', 43", respectively. This provides the possibility of arranging the fine selection electrodes of corresponding apertures electrically parallel, for example, by means of coupling capacitors. If the preselection plate 10a has, for example, 200 rows of apertures, no more than 203 electric connections are required for displaying 600 picture lines on the screen in the case of monochrome display.

Plate 10a may be implemented like plate 10 in FIG. 7.

It is to be noted that "vertical" transport ducts and "horizontally" arranged rows of extraction apertures/selection electrodes are described in the previous embodiments. Instead, the transport ducts may alternatively extend "horizontally" in combination with a "vertical" arrangement of rows of extraction apertures/selection electrodes. In the latter case picture memories for driving the electrodes in the correct manner may be used.

We claim:

1. A picture display device comprising an evacuable envelope and including a face plate bearing a luminescent screen and means for selectively directing electrons toward the screen for producing a picture composed of pixels, said means comprising:

a. at least one electron source;

b. a plurality of adjacent, longitudinally extending transport ducts having respective walls comprising an electrically insulating material having a predetermined secondary emission coefficient, said ducts each having:

(1) an input portion in communication with the at least one electron source for receiving electrons; and (2) means for affecting the transport of the electrons longitudinally through the duct by means of secondary emission to establish a substantially uniform electron current within a predefined length of said duct; and c. selection plate means including:
(1) a first plurality of apertures disposed along said predefined lengths and providing respective passageways for withdrawal of electrons from the transport ducts;
(2) first selection means for effecting the passage of electrons from the ducts through selected ones of the first plurality of apertures for transport toward the screen;
(3) a second plurality of apertures providing respective passageways to the transport ducts from the at least one electron source; and
(4) second selection means for effecting the passage of electrons from the at least one electron source through selected once of the second plurality of apertures and into the ducts.

2. A picture display device as in claim 1 where the at least one electron source is supported by the selection plate means.

3. A picture display device as in claim 1 where the second selection means comprises a plurality of electrodes disposed on the selection plate means and having apertures aligned with the second plurality of apertures.

4. A picture display device as in claim 3 where the at least one electron source is disposed proximate an edge of the selection plate means.

5. A picture display device as in claim 4 including a rear plate connected to the face plate by means of a plurality of partitions, said edge extending beyond at least one of the partitions.

6. A picture display device as in claim 1 where the first plurality of apertures are arranged along parallel lines extending transversely of the transport ducts.

7. A picture display device as in claim 6 where the selection plate means is spaced from the face plate by means of a plurality of mutually parallel walls disposed between adjacent ones of the first plurality of apertures.

8. A picture display device as in claim 7 where the plurality of mutually parallel walls extend transversely of the parallel lines along which the the first plurality of apertures are arranged.

9. A picture display device as in claim 8 where the first plurality of apertures includes, along each parallel line, at least first and second extraction apertures for each duct, and where the first selection means comprises at least first and second systems of electrodes disposed on the selection plate means and having, for each parallel line of apertures, respective first and second apertures aligned with the first and second extraction apertures for each duct.

10. A picture display device as in claim 6 where the screen comprises a predetermined number N of materials for luminescing in respective colors, and where the number of parallel lines of apertures substantially corresponds to N times a number of raster lines to be displayed on the screen.

11. A picture display device as in claim 1 where the selection plate means includes a preselection plate having the first and second pluralities of apertures, and a fine selection plate disposed between the preselection plate and the face plate and having at least two apertures associated with each of said first plurality of apertures.

12. A picture display device as in claim 1 where one side of the selection plate means forms one wall of each duct.

13. A picture display device comprising an evacuable envelope and including a face plate bearing a luminescent screen and means for selectively directing electrons toward the screen for producing a picture composed of pixels, said means comprising:

a. an arrangement of juxtaposed electron sources;
b. a plurality of adjacent, longitudinally extending transport ducts arranged in columns and having respective walls comprising an electrically insulating material having a predetermined secondary emission coefficient, said ducts each having:
(1) an input portion in communication with the at least one electron source for receiving electrons; and
(2) means for effecting the transport of the electrons longitudinally through the duct by means of secondary emission to establish a substantially uniform electron current within a predefined length of said duct; and
c. selection plate means including:
(1) a first plurality of apertures disposed along said predefined lengths and arranged in rows extending transversely of said columns and providing respective passageways between the transport ducts and the screen;
(2) first selection means for effecting the extraction of electrons from the ducts through selected ones of the first plurality of apertures and toward the screen;
(3) a second plurality of apertures providing respective passageways between the transport ducts and the electron sources; and
(4) second selection means for effecting the passage of electrons from the electron sources through selected ones of the second plurality of apertures and into the ducts.

14. A picture display device as in claim 13 where the electron sources are supported by the selection plate means.

15. A picture display device as in claim 13 where the second selection means comprises a plurality of electrodes disposed on the selection plate means and having apertures aligned with the second plurality of apertures.

16. A picture display device as in claim 15 where the electron sources are disposed proximate an edge of the selection plate means.

17. A picture display device as in claim 16 including a rear plate connected to the face plate by means of a plurality of partitions, said edge extending beyond at least one of the partitions.

18. A picture display device as in claim 13 where the rows of the first plurality of apertures are arranged along parallel lines extending transversely of the transport ducts.

19. A picture display device as in claim 18 where the selection plate means is spaced from the face plate by means of a plurality of mutually parallel walls disposed between adjacent ones of the first plurality of apertures.

20. A picture display device as in claim 19 where the plurality of mutually parallel walls extend transversely of the parallel lines along which the the first plurality of apertures are arranged.

21. A picture display device as in claim 20 where the first plurality of apertures includes, along each parallel line, at least first and second extraction apertures for each duct, and where the first selection means comprise at least first and second systems of electrodes disposed on the selection plate means and having, for each parallel line of apertures, respective first and second apertures aligned with the first and second extraction apertures for each duct.

22. A picture display device as in claim 18 where the screen comprises a predetermined number N of materials for luminescing in respective colors, and where the number of parallel lines of apertures substantially corresponds to N times a number of raster lines to be displayed on the screen.

23. A picture display device as in claim 13 where the selection plate means includes a preselection plate having the first and second pluralities of apertures, and a fine selection plate disposed between the preselection plate and the face plate and having at least two apertures associated with each of said first plurality of apertures.

24. A picture display device as in claim 13 where one side of the selection plate means forms one wall of each duct.

25. A picture display device comprising an evacuable envelope and including a face plate bearing a luminescent screen and means for selectively directing electrons toward the screen for producing a picture composed of pixels, said means comprising:
   a. at least one electron source;
   b. a plurality of adjacent, longitudinally extending transport ducts arranged in columns and having respective walls comprising an electrically insulating material having a predetermined secondary emission coefficient, said ducts each having:
      (1) an input portion in communication with the at least one electron source through an input aperture in a longitudinal duct wall for receiving electrons; and
      (2) means for effecting the transport of the electrons longitudinally through the duct by means of secondary emission to establish a substantially uniform electron current within a predefined length of said duct;
   c. selection means including:
      (1) a first plurality of apertures disposed along said predefined lengths and arranged in rows extending transversely of said columns and providing respective passageways between the transport ducts and the screen; and
      (2) first selection means for effecting the extraction of electrons from the ducts through selected ones of the first plurality of apertures and toward the screen; and
      (3) second selection means for effecting the passage of electrons from the at least one electron source through selected ones of the input apertures and into the ducts.

26. A picture display device comprising an evacuable envelope and including a face plate bearing a luminescent screen and means for selectively directing electrons toward the screen for producing a picture composed of pixels, said means comprising:
   a. at least one electron source;
   b. a plurality of adjacent, longitudinally extending transport ducts arranged in columns and having respective walls comprising an electrically insulating material having a predetermined secondary emission coefficient, said ducts each having:
      (1) an input portion in communication with the at least one electron source for receiving electrons; and
      (2) means for effecting the transport of the electrons longitudinally through the duct by means of secondary emission to establish a substantially uniform electron current within a predefined length of said duct;
   c. selection means including:
      (1) a first plurality of apertures disposed along said predefined lengths and arranged in rows extending transversely of said columns and providing respective passageways between the transport ducts and the screen; and
      (2) first selection means for effecting the extraction of electrons from the ducts through selected ones of the first plurality of apertures and toward the screen; and
   d. a front spacer arranged adjacent the luminescent screen, said front spacer having walls of a material having a secondary emission coefficient which, for electron energies above a predetermined magnitude, is so low that in operation there is substantially no field emission.

27. A picture display device comprising an evacuable envelope and including a face plate bearing a luminescent screen and means for selectively directing electrons toward the screen, said means comprising:
   a. at least one electron source;
   b. a plurality of adjacent, longitudinally extending transport ducts arranged in columns and having respective walls comprising an electrically insulating material having a predetermined secondary emission coefficient, said ducts each having:
      (1) an input portion in communication with the at least one electron source for receiving electrons; and
      (2) means for effecting the transport of the electrons longitudinally through the duct by means of secondary emission to establish a substantially uniform electron current within a predefined length of said duct; and
   c. selection means including:
      (1) a first plurality of apertures disposed along said predefined lengths and arranged in rows extending transversely of said columns and providing respective passageways between the transport ducts and the screen; and
      (2) first selection means for effecting the extraction of electrons from the ducts through selected ones of the first plurality of apertures and toward the screen for producing a picture composed of pixels, the pixel spacing along respective lines transverse to the longitudinal axes of the transport ducts being substantially smaller than the pitch of the transport ducts.

28. A picture display device comprising an evacuable envelope and including a face plate bearing a luminescent screen and means for selectively directing electrons toward the screen for producing a picture composed of pixels, said means comprising:
   a. at least one electron source;
   b. a plurality of adjacent, longitudinally extending transport ducts arranged in columns and having respective walls comprising an electrically insulating material having a predetermined secondary emission coefficient, said ducts each having:
      (1) an input portion in communication with the at least one electron source for receiving electrons; and (2) means for effecting the transport of the electrons longitudinally through the duct by means of secondary emission to establish a substantially uniform electron current within a predefined length of said duct; and (3) a plurality of rows of apertures disposed along said predefined length and extending transversely of said columns and providing respective passageways between the transport duct and the screen; and c. selection means for effecting the extraction of electrons from the ducts through selected ones of the apertures and toward the screen.

29. A picture display device comprising evacuable envelope and including a face plate bearing a luminescent screen and means for selectively directing electrons toward the screen for producing a picture composed of pixels, said means comprising:

a. at least one electron source;

b. a plurality of adjacent, longitudinally extending transport ducts arranged in columns and having respective walls comprising an electrically insulating material having a predetermined secondary emission coefficient, said ducts each having:

(1) an input portion in communication with the at least one electron source for receiving electrons; and (2) means for effecting the transport of the electrons longitudinally through the duct by means of secondary emission to establish a substantially uniform electron current within a predefined length of said duct; and c. selection means including a plurality of extraction locations disposed along said predefined lengths and arranged in rows extending transversely of said columns and providing respective passageways between the transport ducts and the screen, there being two selectively drivable extraction apertures per extraction location.

30. A picture display device comprising an evacuable envelope and including a face plate bearing a luminescent screen and means for selectively directing electrons toward the screen for producing a picture composed of pixels, said means comprising:

a. at least one electron source;

b. a plurality of adjacent, longitudinally extending transport ducts arranged in columns and having respective walls comprising an electrically insulating material having a predetermined secondary emission coefficient, said ducts each having:

(1) an input portion in communication with the at least one electron source for receiving electrons; and (2) means for effecting the transport of the electrons longitudinally through the duct by means of secondary emission to establish a substantially uniform electron current within a predefined length of said duct;

c. selection means including:

(1) a first plurality of apertures disposed along said predefined lengths and arranged in rows extending transversely of said columns and providing respective passageways between the transport ducts and the screen; and (2) first selection means for effecting the extraction of electrons from the ducts through selected ones of the first plurality of apertures and toward the screen; and d. measuring means for checking the uniformity of the electron currents established in the respective ducts.

31. A picture display device comprising an evacuable envelope and including a face plate bearing a luminescent screen and means for selectively directing electrons toward the screen for producing a picture composed of pixels, said means comprising:

a. at least one electron source;

b. a plurality of adjacent, longitudinally extending transport ducts arranged in columns and having respective walls comprising an electrically insulating material having a predetermined secondary emission coefficient, said ducts each having:

(1) an input portion in communication with the at least one electron source for receiving electrons; and (2) means for effecting the transport of the electrons longitudinally through the duct by means of secondary emission to establish a substantially uniform electron current within a predefined length of said duct; and (3) first and second walls disposed closer and further, respectively, from the face plate, an auxiliary electrode for helping the electron transport being disposed on said second wall in the proximity of the input portion;

c. selection means including:

(1) a first plurality of apertures disposed in the first walls along said predefined lengths and arranged in rows extending transversely of said columns and providing respective passageways between the transport ducts and the screen; and (2) first selection means for effecting the extraction of electrons from the ducts through selected ones of the first plurality of apertures and toward the screen.

32. A picture display device comprising an evacuable envelope and including a face plate bearing a luminescent screen and means for selectively directing electrons toward the screen for producing a picture composed of pixels, said means comprising:

a. at least one electron source;

b. a plurality of adjacent, longitudinally extending transport ducts arranged in columns and having respective walls comprising an electrically insulating material having a predetermined secondary emission coefficient, said ducts each having:

(1) an input portion in communication with the at least one electron source for receiving electrons; and (2) means for effecting the transport of the electrons longitudinally through the duct by means of secondary emission to establish a substantially uniform electron current within a predefined length of said duct; and c. selection means including:

(1) a plurality of apertures disposed along said predefined lengths and arranged in rows extending transversely of said columns and providing respective passageways between the transport ducts and the screen; and (2) rows of selection electrodes for effecting the extraction of electrons from the ducts through respective selected rows of the plurality of apertures and toward the screen, alternate rows of the selection electrodes including means for connection with external circuitry near one edge of the selection means and rows of the selection electrodes disposed between said alternate rows including means for connection with external circuitry near an opposite edge of the selection means.

33. A picture display device comprising an evacuable envelope and including a face plate bearing a luminescent screen and means for selectively directing electrons toward the screen for producing a picture composed of pixels, said means comprising:
   a. at least one electron source;
   b. a plurality of adjacent, longitudinally extending transport ducts arranged in columns and having respective walls comprising an electrically insulating material having a predetermined secondary emission coefficient, said ducts each having:
      (1) an input portion in communication with the at least one electron source for receiving electrons; and
      (2) means for effecting the transport of the electrons longitudinally through the duct by means of secondary emission to establish a substantially uniform electron current within a predefined length of said duct;
   c. selection means including:
      (1) a plurality of apertures providing respective passageways between the transport ducts and the screen; and
      (2) selection electrodes for effecting the extraction of electrons through selected ones of the plurality of apertures; and
   d. means for producing an accelerating electric field between the selection means and the luminescent screen for accelerating electrons toward the screen, the dimensions of said apertures being selected to prevent penetration of the accelerating electric field.

34. A picture display device as in claim 25, 26, 27, 28, 29, 30, 31, 32 or 33 where the means for effecting the transport of the electrons comprises a resistive layer disposed along the duct length.

35. A picture display device as in claim 25, 26, 27, 28, 29 30, 31, 32 or 33 where the selection means comprises an apertured selection plate means.

36. A picture display device as in claim 25, 26, 27, 28, 29, 30, 31, 32 or 33 where the at least one electron source comprises an arrangement of juxtaposed electron sources.

37. A picture display device as in claim 25 where the selection means comprises an apertured selection plate means which includes the input apertures and the first plurality of apertures.

38. A picture display device as in claim 1 or 13 where the selection plate means includes a preselection plate having the first plurality of apertures and a fine selection plate disposed between the preselection plate and the face plate, said fine selection plate including:
   a. a first plurality of apertures arranged for receiving electrons from respective ones of the first plurality of apertures in the preselection plate;
   b. a second plurality of apertures arranged for receiving electrons from the same respective ones of the first plurality of apertures in said preselection plate;
   c. a first plurality of fine selection electrodes disposed proximate respective ones of the first plurality of apertures;
   d. a second plurality of fine selection electrodes disposed proximate respective ones of the second plurality of apertures.

39. A picture display device as in claim 38 where the first plurality of fine selection electrodes are electrically connected together and where the second plurality of fine selection electrodes are electrically connected together.

40. A picture display device as in claim 1 or 13 where the selection plate means includes a preselection plate having the first plurality of apertures and a fine selection plate disposed between the preselection plate and the face plate, said fine selection plate including, for each of said plurality of apertures:
   a. first, second and third apertures arranged for selectively passing electrons received from the respective aperture in the preselection plate; and
   b. first, second and third fine selection electrodes disposed proximate respective ones of the first, second and third apertures for effecting said selective passage of electrons through said apertures.

41. A picture display device as in claim 40 where the first plurality of fine selection electrodes are electrically connected together, the second plurality of fine selection electrodes are electrically connected together, and the third plurality of fine selection electrodes are electrically connected together.

* * * * *